United States Patent
Taherzadeh Boroujeni et al.

(10) Patent No.: US 12,256,379 B2
(45) Date of Patent: Mar. 18, 2025

(54) DYNAMIC CHANGE OF MAPPING PAYLOAD SIZE TO PUCCH CONFIGURATION

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 17/500,713

(22) Filed: Oct. 13, 2021

(65) Prior Publication Data
US 2022/0124756 A1   Apr. 21, 2022

Related U.S. Application Data

(60) Provisional application No. 63/093,030, filed on Oct. 16, 2020.

(51) Int. Cl.
*H04W 4/00* (2018.01)
*H04W 72/02* (2009.01)
*H04W 72/1268* (2023.01)
*H04W 72/21* (2023.01)
*H04W 72/23* (2023.01)
*H04W 80/02* (2009.01)

(52) U.S. Cl.
CPC ....... *H04W 72/1268* (2013.01); *H04W 72/02* (2013.01); *H04W 72/21* (2023.01); *H04W 72/23* (2023.01); *H04W 80/02* (2013.01)

(58) Field of Classification Search
CPC . H04W 72/1268; H04W 72/21; H04W 72/23; H04W 72/02; H04W 72/231; H04W 72/232; H04W 80/02
See application file for complete search history.

(56) References Cited

U.S. PATENT DOCUMENTS

| 2018/0097578 A1* | 4/2018 | Li | H04W 52/365 |
| 2018/0279298 A1* | 9/2018 | Wang | H04L 1/0027 |
| 2019/0132861 A1* | 5/2019 | Koorapaty | H04L 1/1861 |

(Continued)

FOREIGN PATENT DOCUMENTS

WO   WO-2019073357 A1 *   4/2019   ........... H04L 1/1854

*Primary Examiner* — Edan Orgad
*Assistant Examiner* — Hidayat Dabiri
(74) *Attorney, Agent, or Firm* — Arent Fox Schiff LLP

(57) ABSTRACT

Aspects described herein relate to dynamically updating a mapping of uplink control information (UCI) payload size to the one or more physical uplink control channel (PUCCH) resource sets or the one or more PUCCH formats. For example, a base station or a user equipment (UE) may update the mapping when the UE is in a coverage enhancement condition. The base station or UE may dynamically update the mapping of UCI payload size to the one or more PUCCH resource sets or the one or more PUCCH formats. The UE may map a UCI payload to a selected PUCCH resource set or PUCCH format according to the updated mapping to generate a UCI. Based on the updated mappings, the UE can accordingly transmit UCI based on a selected PUCCH resource set or format, or a base station can receive the UCI based on the selected PUCCH resource set or format.

16 Claims, 7 Drawing Sheets

(56) References Cited

U.S. PATENT DOCUMENTS

| | | | |
|---|---|---|---|
| 2019/0261397 A1* | 8/2019 | Takeda | H04L 5/0094 |
| 2021/0037519 A1* | 2/2021 | Matsumura | H04J 13/0074 |
| 2021/0211241 A1* | 7/2021 | Xiong | H04L 1/1896 |
| 2022/0060293 A1* | 2/2022 | Matsumura | H04L 5/0053 |
| 2022/0104063 A1* | 3/2022 | Akkarakaran | H04W 76/27 |

* cited by examiner

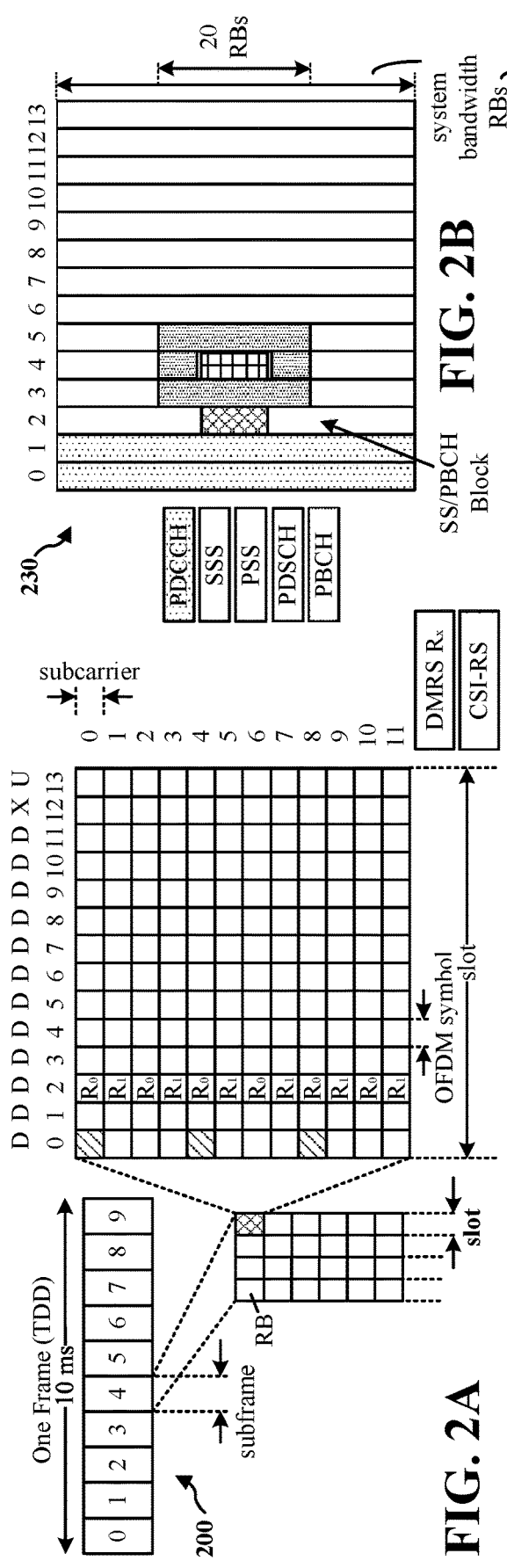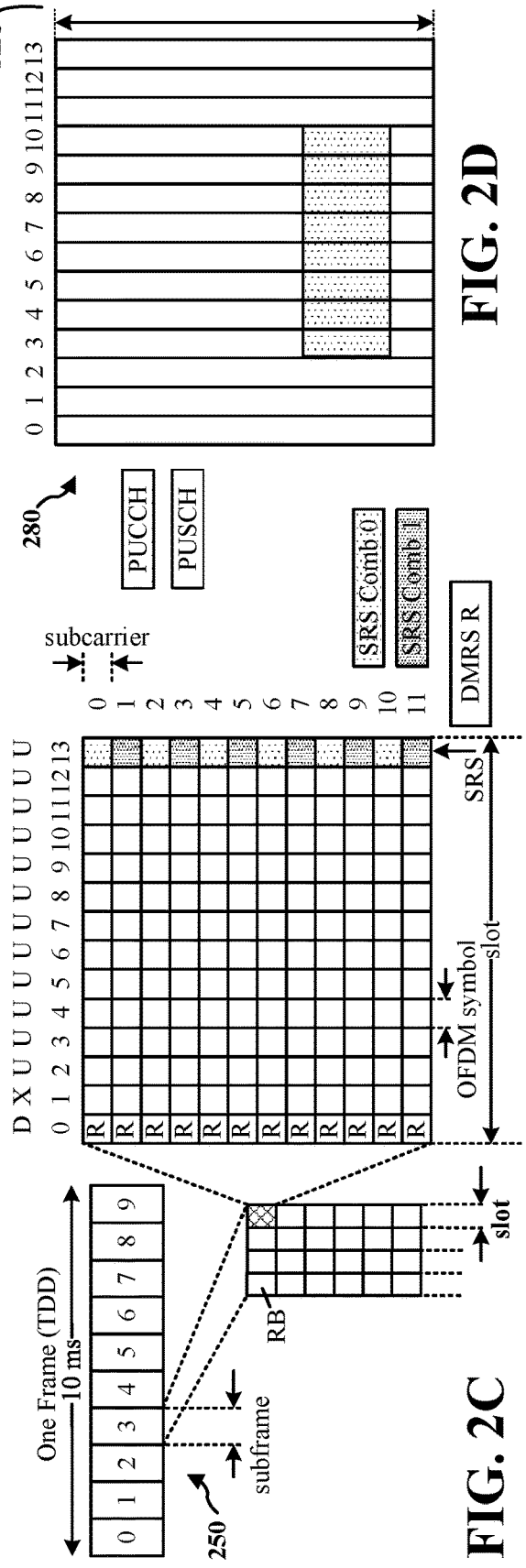
FIG. 2A  FIG. 2B  FIG. 2C  FIG. 2D

US 12,256,379 B2

DYNAMIC CHANGE OF MAPPING PAYLOAD SIZE TO PUCCH CONFIGURATION

CROSS REFERENCE TO RELATED APPLICATIONS

This application claims priority to U.S. Provisional Application Number 63/093,030 titled "DYNAMIC CHANGE OF MAPPING PAYLOAD SIZE TO PUCCH CONFIGURATION," filed Oct. 16, 2020, which is assigned to the assignee hereof, and incorporated herein by reference in its entirety.

BACKGROUND

Technical Field

The present disclosure relates generally to wireless communication systems, and more particularly, to managing physical uplink control channel (PUCCH) configurations.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, in wireless communication technologies, such as 5G, a base station can configure physical uplink control channel (PUCCH) resources for a user equipment (UE), which can include configuring different PUCCH resource sets that the UE can use for a given PUCCH transmission. The PUCCH resource sets may be defined to include an indication of a starting symbol in a slot, a number of symbols, a PUCCH format to use, etc. The PUCCH format can be defined to include an indication of a length of symbols, a number of bits of control information, a waveform, etc. Accordingly, where the base station configures a PUCCH resource set or PUCCH format for the UE, the UE can determine parameters for encoding control information for transmitting over PUCCH resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communications of a user equipment (UE) are provided. The method may include determining a first configuration of one or more physical uplink control channel (PUCCH) resource sets or one or more PUCCH formats, dynamically updating a mapping of uplink control information (UCI) payload size to the one or more PUCCH resource sets or the one or more PUCCH formats, mapping a UCI payload to a selected PUCCH resource set or a selected PUCCH format according to the updated mapping to generate a UCI, and transmitting the UCI based on the selected PUCCH resource set or the selected PUCCH format.

In an aspect of the disclosure, a method, a computer-readable medium, and an apparatus for wireless communications of a base station are provided. The method may include configuring a UE with a first configuration of one or more PUCCH resource sets or one or more PUCCH formats, dynamically updating a mapping of UCI payload size to the one or more PUCCH resource sets or the one or more PUCCH formats for the UE, and receiving a UCI from the UE on a selected PUCCH resource set or using a selected PUCCH format based on the updated mapping and a payload size of the UCI.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects described herein.

FIG. 2B is a diagram illustrating an example of DL channels within a subframe, in accordance with various aspects described herein.

FIG. 2C is a diagram illustrating an example of a second frame, in accordance with various aspects described herein FIG. 2D is a diagram illustrating an example of a subframe, in accordance with various aspects described herein.

DETAILED DESCRIPTION

Figure 1:
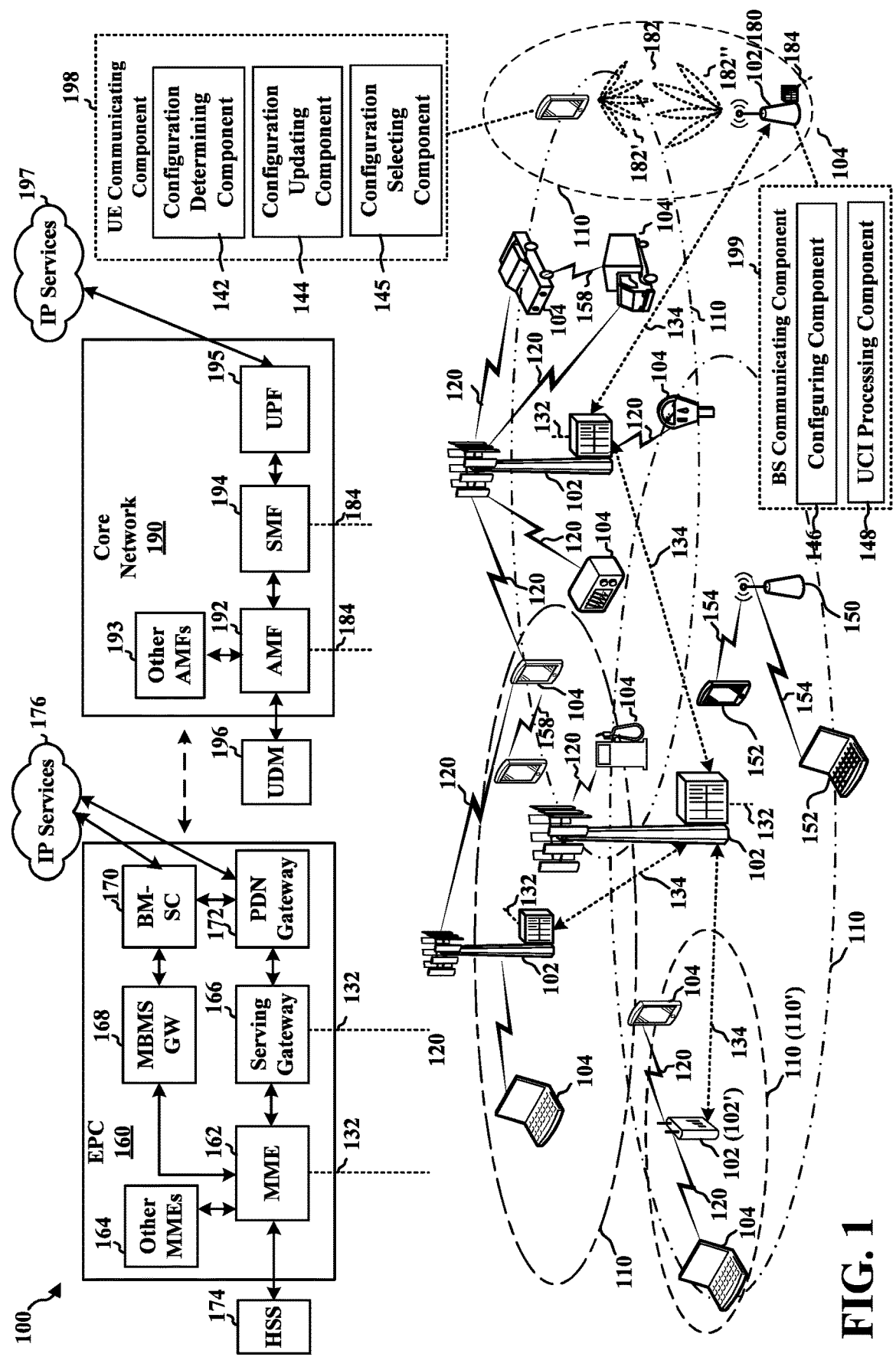
FIG. 1 is a diagram illustrating an example of a wireless communications system, in accordance with various aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

A physical uplink control channel (PUCCH) carries uplink control information (UCI) such as acknowledgments (ACK), negative acknowledgments (NACK), scheduling requests (SR), and channel state information (CSI) from a UE to a base station. Under certain channel conditions, the PUCCH may not be correctly received at the base station. In particular, a PUCCH transmission with a large payload size and short PUCCH format (e.g., PUCCH format 0 and 2 defined in fifth generation (5G) new radio (NR)) may be susceptible to decoding errors. If the base station does not correctly receive the UCI, the base station may assume that downlink transmissions were not received and schedule retransmissions. The base station may also be unable to schedule uplink transmissions. Additionally, not using short PUCCH formats (and only relying on long PUCCH formats in the case of coverage limitations) may cause undue resource usage. Accordingly, coverage enhancement to improve reception of PUCCH may be desirable.

Various aspects relate generally to dynamically modifying parameters for selecting PUCCH resource sets or PUCCH formats to use in transmitting UCI. In an example, a base station can configure various PUCCH resources sets or corresponding PUCCH formats that a UE can use in transmitting UCI, and the base station can indicate which PUCCH resource sets or PUCCH formats to use for a given UCI transmission. The base station, in accordance with aspects described herein, may also dynamically indicate or modify parameters for selecting a PUCCH resource set or PUCCH format for a given UCI transmission, which may allow for accommodating changes in coverage. In an example, the base station can modify a payload size specified for each PUCCH resource set or PUCCH format, or a payload size threshold, to cause the UE to select different PUCCH resource sets or PUCCH formats in certain conditions. For example, the base station can dynamically modify the parameters on a slot or per UCI transmission basis using downlink control information (DCI), media access control (MAC)-control element (CE), or other dynamic signaling.

Particular implementations of the subject matter described in this disclosure can be implemented to realize one or more of the following potential advantages. In some implementations, coverage for UCI transmissions can be enhanced by causing the UE to select, or map a UCI to, a different PUCCH resource set or PUCCH format in certain conditions, where the different PUCCH resource set or PUCCH format may provide a more reliable resource set or format for transmitting the UCI.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, one or more of the UEs 104 may include a UE communicating component 198 for communicating with a base station 102, one or more other UEs 104, etc. UE communicating component 198 can at least transmit UCI to a base station 102. UE communicating component 198 can include one or more of a configuration determining component 142 for determining a configuration of one or more PUCCH resource sets or PUCCH formats that can be used to transmit UCI, a configuration updating component 144 for dynamically updating one or more parameters associated with selecting or mapping to one of the one or more PUCCH resource sets or PUCCH formats, and/or a configuration selecting component 145 for selecting, or mapping UCI to, one of the one or more PUCCH resource sets or PUCCH formats based on the dynamically modified parameter(s) for transmitting UCI to a base station 102.

In an aspect, one or more of the base stations 102 may include a BS communicating component 199 for communicating with one or more UEs 104, other base stations 102, etc. BS communicating component 199 can at least receive UCI from one or more UEs 104 based on configured parameters. BS communicating component 199 can include one or more of a configuring component 146 for configuring one or more PUCCH resources sets or PUCCH formats for a UE 104 or updating one or more parameters related thereto, and/or a UCI processing component 148 for processing UCI received from the UE 104 based on the updated parameter(s).

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, and heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and µ slots/subframe. The subcarrier spacing and symbol length/duration are a function of the numerology. The subcarrier spacing may be equal to $2^{\mu}*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
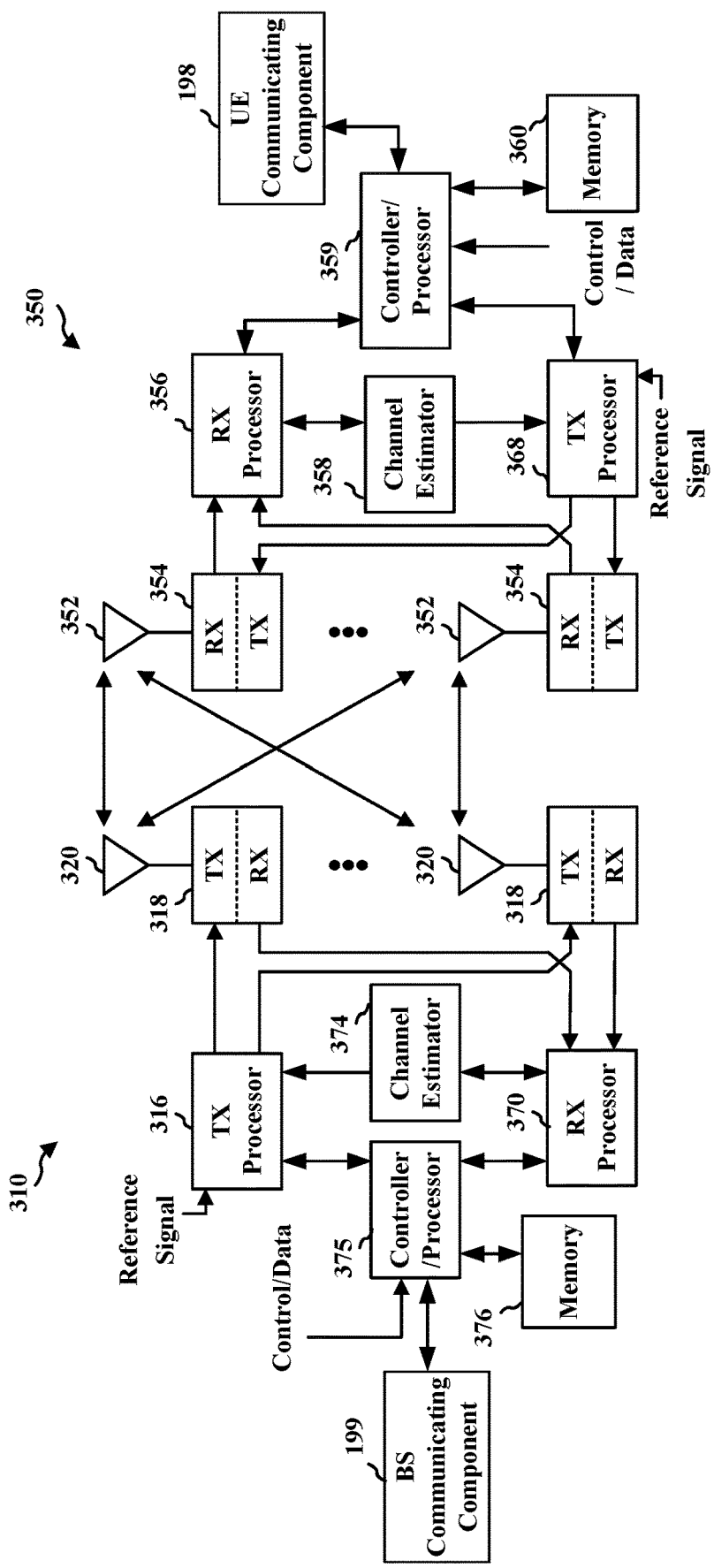
FIG. 3 is a diagram illustrating an example of a base station and user equipment (UE), in accordance with various aspects described herein.

FIG. 3 is a block diagram of a base station 310 in communication with a UE 350. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the UE communicating component 198 of FIG. 1.

At least one of the TX processor 316, the RX processor 370, and the controller/processor 375 may be configured to perform aspects in connection with the BS communicating component 199 of FIG. 1.

Figure 4:
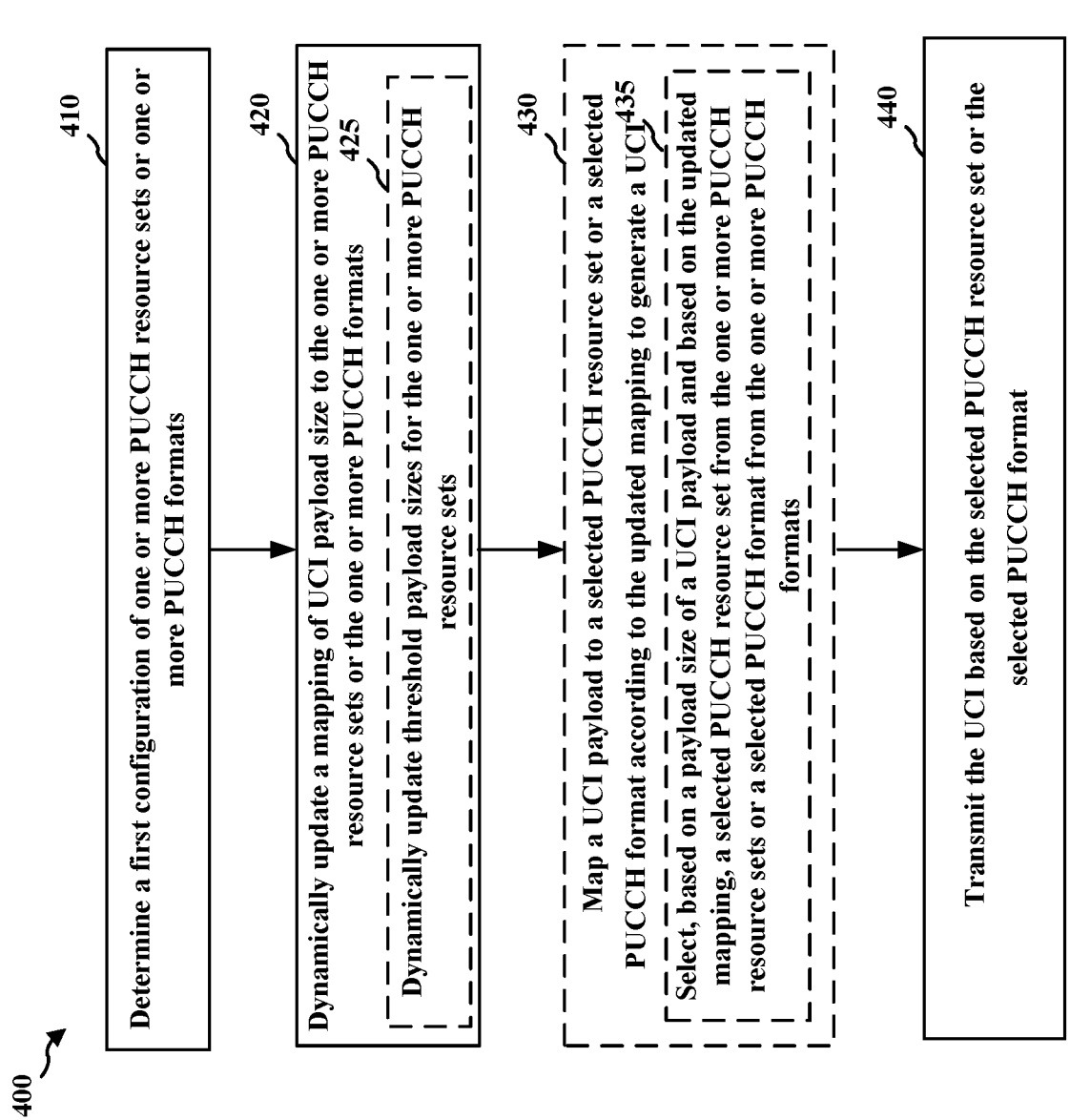
FIG. 4 is a flowchart of an example method for transmitting uplink control information based on a dynamically updated mapping of payload size to resource set or format, in accordance with various aspects described herein.

FIG. 4 is a flowchart of an example method 400 for transmitting uplink control information based on a dynamically updated mapping of payload size to resource set or forma, in accordance with various aspects described herein. The method 400 may be performed by a UE (such as the UE 104, which may include the memory 360 and which may be the entire UE 104 or a component of the UE 104 such as the UE communicating component 198, TX processor 368, the RX processor 356, or the controller/processor 359). The method 400 may be performed by the UE communicating component 198 in communication with the BS communicating component 199 of the base station 102, in one example.

In block 410, the method 400 may include determining a first configuration of one or more PUCCH resource sets or one or more PUCCH formats. In an aspect, for example, configuration determining component 142, for example, in conjunction with the UE communicating component 198 (which may include or operate in conjunction with one or more of the TX processor 368, the RX processor 356, the controller/processor 359, the memory 360, the receiver or transmitter 354, the reception component 602, the transmission component 606, or other components described herein) may determine the first configuration of one or more PUCCH resource sets or one or more PUCCH formats. For example, the UE 104 can be configured with various PUCCH resource sets or corresponding PUCCH formats. For example, the PUCCH resources sets may indicate a starting symbol (for example, an orthogonal frequency division multiplexing (OFDM) symbol) at which to start UCI transmission within a slot of multiple symbols, a length of symbols to use for the UCI transmission, a PUCCH format, or the like. The PUCCH formats can indicate a number of symbols (or range of a number of symbols) to use to transmit UCI, a number of UCI bits that can be transmitted using the PUCCH format, a waveform (for example, computer generated sequence (CGS), OFDM, discrete Fourier transform (DFT)-spread-OFDM (DFT-S-OFDM), or the like) for the PUCCH format, or similar parameters.

The configuration of PUCCH resource sets or PUCCH formats can be specified in a configuration for a wireless communication technology, such as 5G, and accordingly coded in a memory 360 of a UE 104 for determination thereof. In another example, the UE 104 can receive the configuration of PUCCH resource sets or PUCCH formats from a base station 102 (for example, in radio resource control (RRC) signaling or other configurations, or the like). The PUCCH resource sets or PUCCH formats may indicate an index for each resource set or format, such that the base station 102 can indicate one or more resource sets or formats to be used in dynamic configuration. An example of PUCCH formats in 5G is shown below:

| PUCCH Format | Length (in symbols) | UCI bits | Waveform | Description |
| --- | --- | --- | --- | --- |
| 0 | 1-2 | <=2 | CGS | Short PUCCH format with 1-2 bits UCI |
| 1 | 4-14 | <=2 | CGS | Long PUCCH format with 1-2 bits UCI (TD-OCC) |
| 2 | 1-2 | >2 | OFDM | Short PUCCH format with >2 bits UCI and no multiplexing capability |
| 3 | 4-14 | >2 | DFT-S-OFDM | Long PUCCH format with >2 bits UCI and no multiplexing capability |
| 4 | 4-14 | >2 | DFT-S-OFDM | Long PUCCH format with >2 bits UCI and multiplexing capability |

In this example, configuration determining component 142 can know or determine the possible PUCCH formats that can be used for communicating with the base station 102. In another example, configuration determining component 142 can know or determine the possible PUCCH resource sets that can be used for communicating with the base station 102. In an example, the PUCCH resource set or PUCCH formats can be configured with a UCI payload size, such that the UE 104 can determine which PUCCH resource set or PUCCH format to use based on the payload size of UCI to be transmitted. In another example, the PUCCH resource set or PUCCH formats can be configured with a threshold UCI payload size, such that the UE 104 can determine which PUCCH resource set or PUCCH format to use based on comparing the payload size of UCI to be transmitted to the threshold UCI payload sizes of multiple PUCCH resource sets or PUCCH formats.

In block 420, the method 400 may include dynamically updating a mapping of UCI payload size to the one or more PUCCH resource sets or the one or more PUCCH formats. In an aspect, for example, configuration updating component 144, for example, in conjunction with one or more of UE communicating component 198, the TX processor 368, the RX processor 356, or the controller/processor 359, the memory 360, the receiver or transmitter 354, reception component 602, transmission component 606, or other components, may dynamically update the mapping of UCI payload size to the one or more PUCCH resource sets or the one or more PUCCH formats. For example, configuration updating component 144 can modify one or more parameters, such as the payload size or the threshold payload size, associated with the one or more PUCCH resource sets or the one or more PUCCH formats to be different than a value previously configured by the base station 102. In an example, dynamically updating the mapping of the UCI payload size can include configuration updating component 144 receiving, from the base station 102, an indication to update the mapping of the UCI payload size (or the threshold UCI payload size) associated with the one or more PUCCH resource sets or the one or more PUCCH formats. In this regard, as described, the base station 102 can dynamically update the payload size or threshold payload size in certain scenarios (for example, to improve coverage for PUCCH transmissions where certain channel conditions are determined to be undesirable or under threshold values).

In a specific example, the base station 102 may dynamically change the mapping from payload size to PUCCH resource set and/or PUCCH format or dynamically change a threshold of payload sizes corresponding to a PUCCH resource set and/or PUCCH format. The dynamic indication may be transmitted by UE-specific and/or group-common DCI or downlink MAC-CE, as described above. Thus, for example, configuration updating component 144 may receive the UE-specific or group-common DCI or downlink MAC-CE from the base station 102, and can accordingly update the payload size or threshold payload size for one or more PUCCH resource sets or PUCCH formats as indicated in the configuration.

In one example, the base station 102 may explicitly indicate the size or the threshold in the dynamic indication. This may include an explicit indication of a new payload size value or a new threshold value. In another example, this may include an indication of a configuration to which to switch for the one or more PUCCH resource sets or the one or more PUCCH formats. For example, the base station 102 can indicate (e.g., in RRC or other semi-static signaling), or the UE 104 may otherwise store in memory 360, one or more configurations of PUCCH resource sets or PUCCH formats, along with associated payload sizes or threshold payload sizes and a configuration index or other identifier. In this example, the base station 102 can dynamically indicate (e.g., in DCI or downlink MAC-CE) to switch to a different configuration, or otherwise activate an alternative configuration, with different payload size or threshold payload size based on the configurations (e.g., by indicating the configuration index). In this example, configuring updating component 144 can receive the dynamic indication and can accordingly update the one or more parameters (e.g., the payload size or threshold size) for the one or more PUCCH resource sets or PUCCH formats. In an example, the configurations can include a primary, or default, configuration, one or more secondary configurations, etc. Thus, the dynamic indication may include a bit indicating whether to use the primary or secondary configuration, a configuration identifier, as described, etc.

In another example, the base station 102 may implicitly indicate the size or threshold in the dynamic indication. For example, configuration updating component 144 may decrease a payload size or threshold payload size for one or more PUCCH resource sets or one or more PUCCH formats based on receiving, from the base station, a coverage enhancement indication (e.g., in DCI or MAC-CE or other signaling), based on the PUCCH including an acknowledgement (ACK) in response to a PDSCH that carries beam-switching MAC-CE or other prioritized signals (e.g., to increase coverage for receiving the ACK to this type of signal), etc. In this example, the configuration updating component 144 can determine that the coverage enhancement indication is received or that an ACK is being transmitted to a certain type of signal (e.g., beam-switching MAC-CE) and can accordingly decrease payload size or threshold payload size for one or more PUCCH resource sets or PUCCH formats.

In addition, in an example, whether the dynamic change is by implicit or explicit indication, configuration updating component 144 can determine to dynamically modify the payload size or threshold payload size for the one or more PUCCH resource sets or PUCCH formats only for the given UCI transmission or only for the slot or other time period associated with the dynamic indication, after which time the configuration updating component 144 can revert the payload size or threshold payload size to values in the originally received configuration (e.g., values from an RRC configuration). In another example, configuration updating component 144 can determine to dynamically modify the payload size or threshold payload size until another indication to modify the payload size or threshold payload size is received from the base station 102.

In block 430, the method 400 may optionally include mapping a UCI payload to a selected PUCCH resource set or a selected PUCCH format according to the updated mapping to generate a UCI. In an aspect, for example, configuration selecting component 145, for example, in conjunction with one or more of UE communicating component 198, the TX processor 368, the RX processor 356, or the controller/processor 359, the memory 360, the receiver or transmitter 354, reception component 602, transmission component 606, or other components, may map the UCI payload to the selected PUCCH resource set or the selected PUCCH format according to the updated mapping to generate the UCI.

In an example, mapping the UCI may include or may be based on, optionally at block 435, selecting, based on a payload size of a UCI payload and based on the updated mapping, a selected PUCCH resource set from the one or more PUCCH resource sets or a selected PUCCH format from the one or more PUCCH formats. In an aspect, for example, configuration selecting component 145, for example, in conjunction with one or more of UE communicating component 198, the TX processor 368, the RX processor 356, or the controller/processor 359, the memory 360, the receiver or transmitter 354, reception component 602, transmission component 606, or other components, may select, based on a payload size of a UCI payload and based on the updated mapping, a selected PUCCH resource set from the one or more PUCCH resource sets or a selected PUCCH format from the one or more PUCCH formats.

For example, configuration selecting component 145 can determine one PUCCH resource set from one or more (e.g., up to K=4) configured PUCCH resource sets based on the UCI payload size (e.g., not including cyclic redundancy check (CRC)). The selection of a PUCCH resource set can be based on a comparison between the UCI payload size OUCI and a threshold associated with each PUCCH resource set. The threshold for PUCCH resource set 0, for example, can be fixed at 2 (bits), which implies that PUCCH resource set 0 can be used for 1-bit or 2-bit OUCI, but OUCI>2 can use a PUCCH resource set with a higher index. For example, PUCCH resource sets 1, 2, or 3 may each be separately configured with a threshold payload size (which may be up to 1706 bits in 5G). If the threshold parameter for a PUCCH resource set (1, 2, or 3) is not configured, the threshold can be assumed to be 1706 (bits), which implies the PUCCH resource set can support up to 1706 bits. The number 1706 can be the maximum possible bits for UCI on PUCCH. For OUCI>2, configuration selecting component 145 can sequentially compare OUCI and the threshold payload sizes for PUCCH format set 1, 2, and 3, respectively, and determine the appropriate PUCCH resource set for a PUCCH transmission. As described, in the examples above, the threshold payload sizes may be dynamically modified to cause the UE 104 to select a different PUCCH resource set, which may be used to provide additional coverage for UCI transmission in coverage limited scenarios. For example, at block 425, dynamically updating the mapping of UCI payload size to the one or more PUCCH resource sets may optionally include dynamically updating threshold payload sizes for the one or more PUCCH resource sets. For instance, the configuration selecting component 145 may sequentially compare the UCI payload to each of the dynamically updated threshold payload sizes for the one or more PUCCH resource sets.

In block 440, the method 400 may include transmitting the UCI based on the selected PUCCH resource set or the selected PUCCH format. In an aspect, for example, UE communicating component 198, for example, in conjunction with one or more of the TX processor 368, the RX processor 356, or the controller/processor 359, the memory 360, the receiver or transmitter 354, reception component 602, transmission component 606, or other components, may transmit the UCI based on the selected PUCCH resource set or the selected PUCCH format. For example, UE communicating component 198 can transmit the UCI over resources indicated in the selected PUCCH resource set (e.g., at a starting symbol indicated for the PUCCH resource set, for a symbol length indicated for the PUCCH resource set, etc.) or using the associated PUCCH format (e.g., selecting the PUCCH resource set based on a PUCCH format indicated in DCI, based on the waveform associated with the PUCCH format, etc.).

Figure 5:
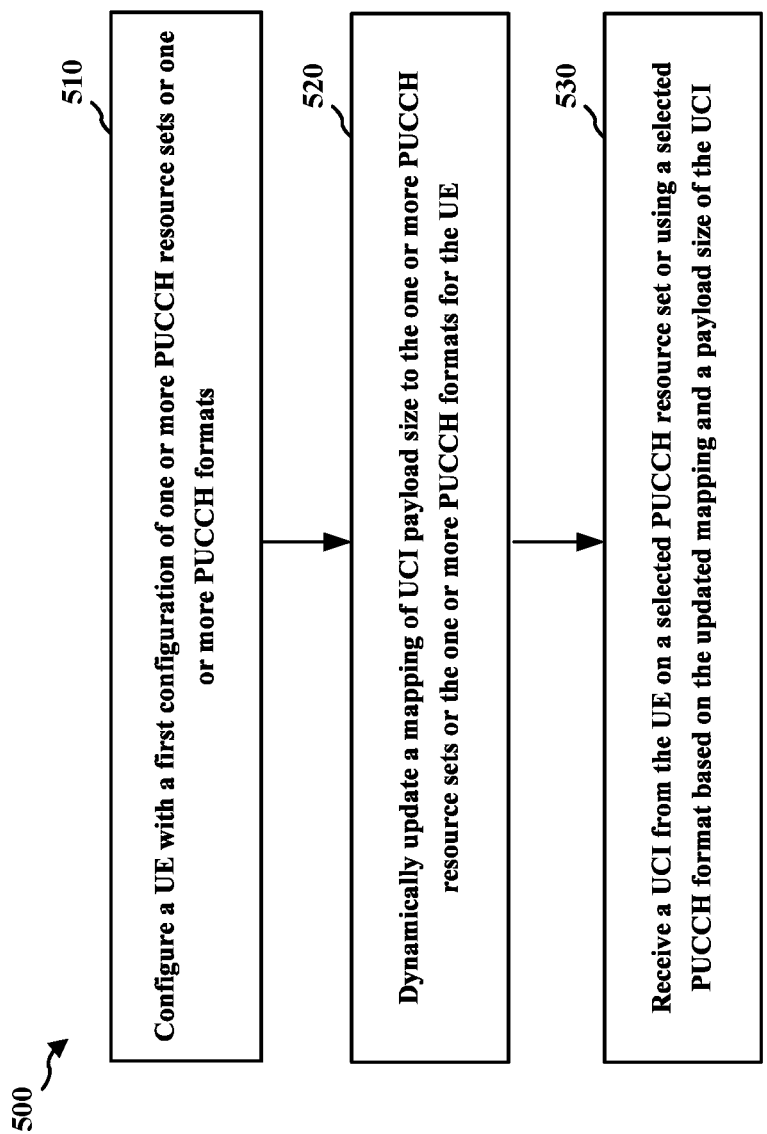
FIG. 5 is a flowchart of an example method for receiving uplink control information based on a dynamically updated mapping of payload size to resource set or format, in accordance with various aspects described herein.

FIG. 5 is a flowchart of an example method 500 for receiving uplink control information based on a dynamically updated mapping of payload size to resource set or format, in accordance with various aspects described herein. The method 500 may be performed by a base station (such as the base station 102, which may include the memory 376 and which may be the entire base station 102 or a component of the base station 102 such as the BS communicating component 199, TX processor 316, the RX processor 370, or the controller/processor 375). The method 500 may be performed by the BS communicating component 199 in communication with the UE communicating component 198 of the UE 104, in one example.

In block 510, the method 500 may include configuring a UE with a first configuration one or more PUCCH resource sets or one or more PUCCH formats. In an aspect, for example, configuring component 146, for example, in conjunction with the BS communicating component 199 (which may include or operate in conjunction with one or more of the TX processor 316, the RX processor 370, the controller/processor 375, the memory 376, the receiver or transmitter 318, the reception component 702, the transmission component 706, or other components described herein) may configure the UE (for example, UE 104) with a first configuration of one or more PUCCH resource sets or one or more PUCCH formats. For example, as described above, configuring component 146 can configure the UE 104 with the one or more PUCCH resource sets or PUCCH formats, which may include, for PUCCH resource sets, indices, starting symbols, symbol lengths, PUCCH format, etc., or may include, for PUCCH formats, symbol length, UCI size, waveform, etc. In this regard, a UE 104 can select or otherwise determine a PUCCH resource set or PUCCH format to use in transmitting a UCI payload, as described above. In addition, in an example, configuring component 146 can configure the UE 104 with payload size or threshold payload size to be associated with each of the one or more PUCCH resource sets or PUCCH formats. In one example, configuring component 146 can transmit the first configuration to the UE 104 using RRC signaling or other semi-static signaling.

In block 520, the method 500 may include dynamically updating a mapping of UCI payload size to the one or more PUCCH resource sets or the one or more PUCCH formats for the UE. In an aspect, for example, configuring component 146, for example, in conjunction with one or more of BS communicating component 199, the TX processor 316, the RX processor 370, the controller/processor 375, the memory 376, the receiver or transmitter 318, reception component 702, transmission component 706, or other components, may dynamically update the mapping of UCI payload size to the one or more PUCCH resource sets or the one or more PUCCH formats for the UE (for example, UE 104). For example, configuring component 146 can dynamically update the mapping of UCI payload size or threshold UCI payload size for one or more PUCCH resource sets or PUCCH formats to cause the UE 104 to select a different PUCCH resource set or PUCCH format (e.g., to provide improved coverage in coverage-limited scenarios). For example, configuring component 146 can dynamically update the mapping of UCI payload size or threshold UCI payload size for one or more PUCCH resource sets or PUCCH formats based on an implicit or explicit indication transmitted in DCI or a downlink MAC-CE, as described above.

For example, configuring component 146 can dynamically update the mapping of UCI payload size or threshold UCI payload size to the one or more PUCCH resource sets or PUCCH formats by indicating the values explicitly, by indicating to switch among configurations of payload size and PUCCH resource set or format, by implicit indication based on transmitting a coverage enhancement indication or certain type of signal (e.g., beam switching MAC-CE), etc.

In block 530, the method 500 may include receiving a UCI from the UE on a selected PUCCH resource set or using a selected PUCCH format based on the updated mapping and a payload size of the UCI. In an aspect, for example, UCI processing component 148, for example, in conjunction with one or more of BS communicating component 199, the TX processor 316, the RX processor 370, the controller/processor 375, the memory 376, the receiver or transmitter 318, reception component 702, transmission component 706, or other components, may receive, or process, the UCI from the UE (for example, UE 104) on the selected PUCCH resource set or using the selected PUCCH format based on the updated mapping and the payload size of the UCI. As described, the UE 104 can select the PUCCH resource set or PUCCH format based on the dynamically updated UCI payload sizes or threshold UCI payload sizes by determining which of multiple PUCCH resource sets or PUCCH formats correspond to a payload size of the UCI. UCI processing component 148 may, for example, accordingly determine parameters of the PUCCH resource set or PUCCH format for processing the UCI. For example, UCI processing component 148 can determine, based on the payload size of the UCI and based on the updated UCI payload size or threshold UCI payload size associated with the PUCCH resource sets or PUCCH format, the PUCCH resource set or PUCCH format and associated parameters (e.g., starting symbol, symbol length, waveform, etc.) for processing the UCI.

Figure 6:
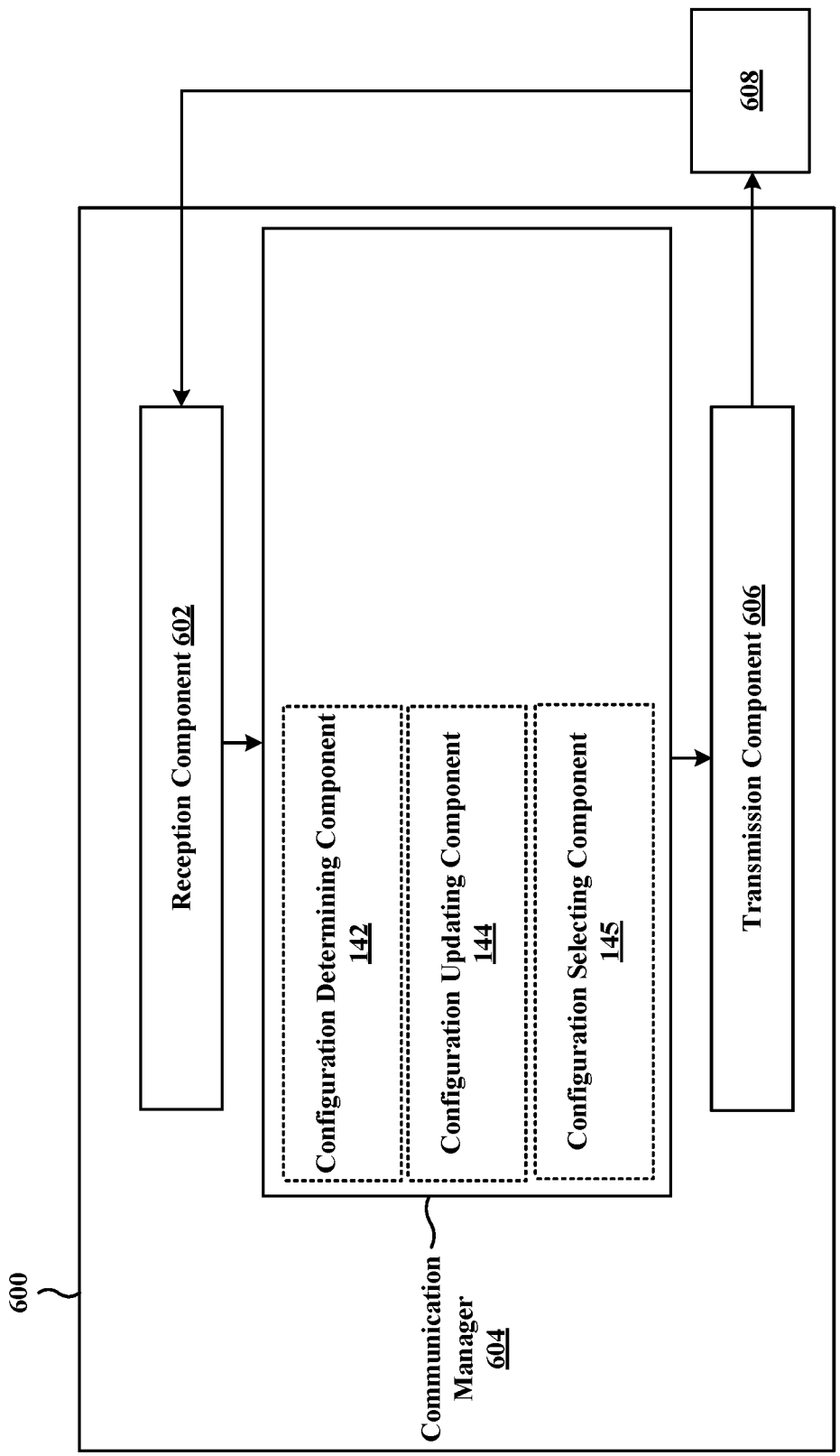
FIG. 6 is a block diagram of an example apparatus such as a UE, for wireless communication, in accordance with various aspects described herein.

FIG. 6 is a block diagram of an example apparatus 600 for wireless communication. The apparatus 600 may be a UE or a UE may include the apparatus 600. In some aspects, the apparatus 600 includes a reception component 602, a communication manager 604, and a transmission component 606, which may be in communication with one another (for example, via one or more buses). As shown, the apparatus 600 may communicate with another apparatus 608 (such as a UE, a base station, or another wireless communication device) using the reception component 602 and the transmission component 606.

In some aspects, the apparatus 600 may be configured to perform one or more processes described herein, such as method 400 of FIG. 4. In some aspects, the apparatus 600 may include one or more components of the UE described above in connection with FIG. 1.

The reception component 602 may receive communications, such as reference signals, control information, data communications, or a combination thereof, from the apparatus 608. The reception component 602 may provide received communications to one or more other components of the apparatus 600, such as the communication manager 604. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 602 may include one or more antennas, a demodulator, a MIMO detector, a receive processor, a controller/processor, a memory, or a combination thereof, of the UE described above in connection with FIG. 1.

The transmission component 606 may transmit communications, such as reference signals, control information, data communications, or a combination thereof, to the apparatus 608. In some aspects, the communication manager 604 may generate communications and may transmit the generated communications to the transmission component 606 for transmission to the apparatus 608. In some aspects, the transmission component 606 may perform signal processing on the generated communications (such as filtering, amplification, modulation, digital-to-analog conversion, multiplexing, interleaving, mapping, or encoding, among other examples), and may transmit the processed signals to the apparatus 608. In some aspects, the transmission component 606 may include one or more antennas, a modulator, a transmit MIMO processor, a transmit processor, a controller/processor, a memory, or a combination thereof, of the UE described above in connection with FIG. 1. In some aspects, the transmission component 606 may be collocated with the reception component 602 in a transceiver.

The communication manager 604 may be similar to or may include a UE communicating component 198, as described herein. Thus, the communication manager 604 may be configured to determine a first configuration of one or more PUCCH resource sets or one or more PUCCH formats, dynamically update a mapping of UCI payload size to the one or more PUCCH resource sets or the one or more PUCCH formats, map a UCI payload to a selected PUCCH resource set or a selected PUCCH format according to the updated mapping to generate a UCI, transmit the UCI based on the selected PUCCH resource set or the selected PUCCH format, etc. In some aspects, the communication manager 604 may include a controller/processor, a memory, or a combination thereof, of the UE described above in connection with FIG. 1.

In some aspects, the communication manager 604 may include a set of components, such as a configuration determining component 142, configuration updating component 144, configuration selection component 145, or a combination thereof. Alternatively, the set of components may be separate and distinct from the communication manager 604. In some aspects, one or more components of the set of components may include or may be implemented within a controller/processor, a memory, or a combination thereof, of the UE described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

Figure 7:
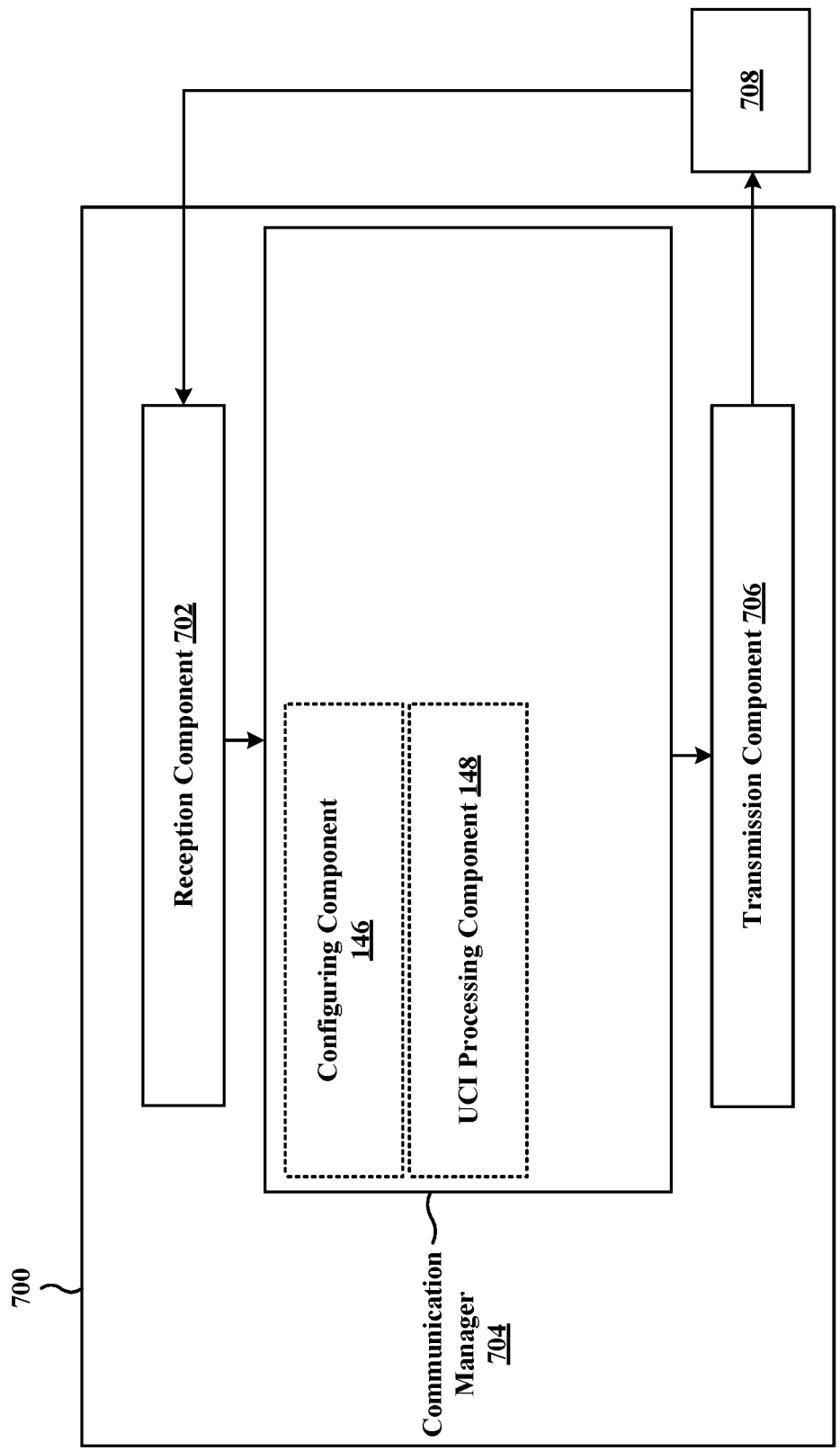
FIG. 7 is a block diagram of an example apparatus such as a base station, for wireless communication, in accordance with various aspects described herein.

FIG. 7 is a block diagram of an example apparatus 700 for wireless communication. The apparatus 700 may be a base station or a base station may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as a UE, a base station, or another wireless communication device) using the reception component 702 and the transmission component 706.

In some aspects, the apparatus 700 may be configured to perform one or more processes described herein, such as method 500 of FIG. 5. In some aspects, the apparatus 700 may include one or more components of the base station described above in connection with FIG. 1.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the base station described above in connection with FIG. 1.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the base station described above in connection with FIG. 1. In some aspects, the transmission component 706 may be collocated with the reception component 702 in a transceiver.

The communication manager 704 may be similar to or may include a BS communicating component 199, as described herein. Thus, the communication manager 704 may be configured to configure a UE with a first configuration of one or more PUCCH resource sets or one or more PUCCH formats, dynamically update a mapping of UCI payload size to the one or more PUCCH resource sets or the one or more PUCCH formats for the UE, receive a UCI from the UE on a selected PUCCH resource set or using a selected PUCCH format based on the updated mapping and a payload size of the UCI, etc. In some aspects, the communication manager 704 may include a controller/processor, a memory, a scheduler, a communication unit, or a combination thereof, of the base station described above in connection with FIG. 1.

In some aspects, the communication manager 704 may include a set of components, such as a configuring component 146, UCI processing component 148, or a combination thereof. Alternatively, the set of components may be separate and distinct from the communication manager 704. In some aspects, one or more components of the set of components may include or may be implemented within a controller/processor, a memory, a scheduler, a communication unit, or a combination thereof, of the base station described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 1.

The following aspects are illustrative only and aspects thereof may be combined with aspects of other embodiments or teaching described herein, without limitation.

Aspect 1 is a method of wireless communication including determining a first configuration of one or more physical uplink control channel (PUCCH) resource sets or one or more PUCCH formats, dynamically updating a mapping of uplink control information (UCI) payload size to the one or more PUCCH resource sets or the one or more PUCCH formats, mapping a UCI payload to a selected PUCCH resource set or a selected PUCCH format according to the updated mapping to generate a UCI, and transmitting the UCI based on the selected PUCCH resource set or the selected PUCCH format.

In Aspect 2, the method of Aspect 1 further includes wherein dynamically updating the mapping of the UCI payload size includes changing a threshold payload size of the one or more PUCCH resource sets or the one or more PUCCH formats.

In Aspect 3, the method of any of Aspects 1 or 2 further includes wherein dynamically updating the mapping of the UCI payload size is based on receiving a downlink control information (DCI) or media access control (MAC) control element (CE) indicating the updated mapping.

In Aspect 4, the method of Aspect 3 includes wherein the DCI is a UE specific DCI or a group-common DCI.

In Aspect 5, the method of any of Aspects 3 or 4 includes wherein the DCI or MAC-CE indicates a threshold payload size for the one or more PUCCH resource sets or the one or more PUCCH formats.

In Aspect 6, the method of any of Aspects 3 to 5 includes wherein the DCI or MAC-CE indicates activation of an alternative configuration for the one or more PUCCH resource sets or the one or more PUCCH formats.

In Aspect 7, the method of any of Aspects 1 to 6 includes wherein dynamically updating the mapping of UCI payload size includes switching between the first configuration and an alternative configuration of the one or more PUCCH resource sets or the one or more PUCCH formats.

In Aspect 8, the method of any of Aspects 1 to 7 includes wherein dynamically updating the mapping of UCI payload size is based on signaling that implicitly indicates a change to PUCCH configuration.

In Aspect 9, the method of Aspect 8 includes wherein dynamically updating the mapping of UCI payload size is based on receiving a coverage enhancement indication.

In Aspect 10, the method of any of Aspects 8 or 9 includes wherein dynamically updating the mapping of UCI payload size is based on the UCI including an acknowledgment of a physical downlink shared channel (PDSCH) transmission that carries a beam switching MAC-CE.

In Aspect 11, the method of any of Aspects 1 to 10 includes wherein determining the first configuration of one or more PUCCH resource sets and one or more PUCCH formats includes receiving a radio resource control message.

In Aspect 12, the method of any of Aspects 1 to 11 includes wherein dynamically updating the mapping of UCI payload size to the one or more PUCCH resource sets includes dynamically updating threshold payload sizes for the one or more PUCCH resource sets.

In Aspect 13, the method of Aspect 12 includes wherein mapping the UCI payload to the selected PUCCH resource set according to the updated mapping to generate the UCI includes sequentially comparing the UCI payload to each of the dynamically updated threshold payload sizes for the one or more PUCCH resource sets.

Aspect 14 is a method of wireless communication including configuring a user equipment (UE) with a first configuration of one or more physical uplink control channel (PUCCH) resource sets or one or more PUCCH formats, dynamically updating a mapping of uplink control information (UCI) payload size to the one or more PUCCH resource sets or the one or more PUCCH formats for the UE, and receiving a UCI from the UE on a selected PUCCH resource set or using a selected PUCCH format based on the updated mapping and a payload size of the UCI.

In Aspect 15, the method of Aspect 14 includes wherein dynamically updating the mapping of the UCI payload size includes changing a threshold payload size of the one or more PUCCH resource sets or the one or more PUCCH formats.

In Aspect 16, the method of any of Aspects 14 or 15 includes wherein dynamically updating the mapping of the UCI payload size includes transmitting a downlink control information (DCI) or media access control (MAC) control element (CE) indicating the updated mapping.

In Aspect 17, the method of Aspect 16 includes wherein the DCI is a UE specific DCI or a group-common DCI.

In Aspect 18, the method of any of Aspects 16 or 17 include wherein the DCI or MAC-CE indicates a threshold payload size for the one or more PUCCH resource sets or the one or more PUCCH formats.

In Aspect 19, the method of any of Aspects 16 to 18 include wherein the DCI or MAC-CE indicates activation of an alternative configuration of the one or more PUCCH resource sets or the one or more PUCCH formats.

In Aspect 20, the method of any of Aspects 16 to 18 include wherein dynamically updating the mapping of UCI payload size includes switching between the first configuration and an alternative configuration of the one or more PUCCH resource sets or the one or more PUCCH formats.

In Aspect 21, the method of any of Aspects 16 to 20 include wherein dynamically updating the mapping of UCI payload size includes transmitting signaling that implicitly indicates a change to PUCCH configuration.

In Aspect 22, the method of Aspect 21 includes wherein the signaling that implicitly indicates the change to the PUCCH configuration is a coverage enhancement indication.

In Aspect 23, the method of any of Aspects 21 or 22 include wherein the signaling that implicitly indicates the change to the PUCCH configuration is a beam switching MAC-CE.

In Aspect 24, the method of any of Aspects 14 to 23 include wherein configuring the first configuration of the one or more PUCCH resource sets or the one or more PUCCH formats includes transmitting a radio resource control message.

Aspect 25 is an apparatus for wireless communication including a transceiver, a memory configured to store instructions, and one or more processors communicatively coupled with the transceiver and the memory, wherein the one or more processors are configured to execute the instructions to perform the operations of one or more methods in Aspects 1 to 24.

Aspect 26 is an apparatus for wireless communication, including means for performing the operations of one or more methods in Aspects 1 to 24.

Aspect 27 is a computer-readable medium, including code executable by one or more processors to perform the operations of one or more methods in Aspects 1 to 24.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for".

What is claimed is:

1. A method of wireless communication, comprising:
    determining a first configuration of one or more physical uplink control channel (PUCCH) resource sets or one or more PUCCH formats;
    dynamically updating a mapping of uplink control information (UCI) payload size to the one or more PUCCH resource sets or to the one or more PUCCH formats, wherein dynamically updating the mapping of the UCI payload size includes changing a threshold payload size that is applicable to the one or more PUCCH resource sets or applicable to the one or more PUCCH formats, wherein the change to the threshold payload size is based on signaling that implicitly indicates a change to PUCCH configuration;
    mapping a UCI payload to a selected PUCCH resource set or a selected PUCCH format according to the updated mapping based on a comparison between the UCI payload size and the threshold payload size to generate a UCI; and
    transmitting the UCI based on the selected PUCCH resource set or the selected PUCCH format.

2. The method of claim 1, wherein dynamically updating the mapping of UCI payload size includes switching between the first configuration and an alternative configuration of the one or more PUCCH resource sets or the one or more PUCCH formats.

3. The method of claim 1, wherein the implicit signaling is a coverage enhancement indication.

4. The method of claim 1, wherein the implicit signaling is based on the UCI including an acknowledgment of a physical downlink shared channel (PDSCH) transmission that carries a beam switching MAC-CE.

5. The method of claim 1, wherein determining the first configuration of the one or more PUCCH resource sets and the one or more PUCCH formats includes receiving a radio resource control message.

6. The method of claim 1, wherein dynamically updating the mapping of UCI payload size to the one or more PUCCH resource sets comprises dynamically updating the threshold payload size for each of the one or more PUCCH resource sets.

7. The method of claim 6, wherein mapping the UCI payload to the selected PUCCH resource set according to the updated mapping to generate the UCI comprises sequentially comparing the UCI payload to each of the dynamically updated threshold payload sizes for the one or more PUCCH resource sets.

8. A method of wireless communication, comprising:
    configuring a user equipment (UE) with a first configuration of one or more physical uplink control channel (PUCCH) resource sets or one or more PUCCH formats;
    dynamically updating a mapping of uplink control information (UCI) payload size to the one or more PUCCH resource sets or to the one or more PUCCH formats for the UE, wherein dynamically updating the mapping of the UCI payload size includes changing a threshold payload size of the that is applicable to the one or more PUCCH resource sets or applicable to the one or more PUCCH formats, wherein the change to the threshold payload size is based on signaling that implicitly indicates a change to PUCCH configuration; and
    receiving a UCI from the UE on a selected PUCCH resource set or using a selected PUCCH format based on a comparison between the threshold payload size of the updated mapping and a payload size of the UCI.

9. The method of claim 8, wherein dynamically updating the mapping of UCI payload size includes switching between the first configuration and an alternative configuration of the one or more PUCCH resource sets or the one or more PUCCH formats.

10. The method of claim 8, wherein the signaling that implicitly indicates the change to the PUCCH configuration is a coverage enhancement indication.

11. The method of claim 8, wherein the signaling that implicitly indicates the change to the PUCCH configuration is a beam switching MAC-CE.

12. The method of claim 8, wherein configuring the first configuration of the one or more PUCCH resource sets or the one or more PUCCH formats includes transmitting a radio resource control message.

13. An apparatus for wireless communication, comprising:
    a transceiver;
    a memory configured to store instructions; and
    one or more processors communicatively coupled with the transceiver and the memory,
    wherein the one or more processors are configured to execute the instructions to:
        determine a first configuration of one or more physical uplink control channel (PUCCH) resource sets or one or more PUCCH formats;

dynamically update a mapping of uplink control information (UCI) payload size to the one or more PUCCH resource sets or to the one or more PUCCH formats by changing a threshold payload size that is applicable to the one or more PUCCH resource sets or applicable to the one or more PUCCH formats, wherein the change to the threshold payload size is based on signaling that implicitly indicates a change to PUCCH configuration;

map a UCI payload to a selected PUCCH resource set or a selected PUCCH format according to the updated mapping based on a comparison between the UCI payload size and the threshold payload size to generate a UCI; and transmit the UCI based on the selected PUCCH resource set or the selected PUCCH format.

14. The apparatus of claim 13, wherein to dynamically update the mapping of UCI payload size, the one or more processors are configured to switch between the first configuration and an alternative configuration of the one or more PUCCH resource sets or the one or more PUCCH formats.

15. The apparatus of claim 13, wherein the one or more processors are configured to:

dynamically update the threshold payload size for each of the one or more PUCCH resource sets; and sequentially compare the UCI payload to each of the dynamically updated threshold payload sizes for the one or more PUCCH resource sets.

16. An apparatus for wireless communication, comprising:

a transceiver;

a memory configured to store instructions; and one or more processors communicatively coupled with the transceiver and the memory, wherein the one or more processors are configured to execute the instructions to:

configure a user equipment (UE) with a first configuration of one or more physical uplink control channel (PUCCH) resource sets or one or more PUCCH formats;

dynamically update a mapping of uplink control information (UCI) payload size to the one or more PUCCH resource sets or to the one or more PUCCH formats for the UE by changing a threshold payload size that is applicable to the one or more PUCCH resource sets or applicable to the one or more PUCCH formats, wherein the change to the threshold payload size is based on signaling that implicitly indicates a change to PUCCH configuration; and receive a UCI from the UE on a selected PUCCH resource set or using a selected PUCCH format based on a comparison between the threshold payload size of the updated mapping and a payload size of the UCI.

* * * * *